United States Patent
Shelley et al.

(10) Patent No.: US 12,129,841 B2
(45) Date of Patent: Oct. 29, 2024

(54) VACUUM PUMPING

(71) Applicant: Edwards Limited, Burgess Hill (GB)

(72) Inventors: Gerald Robin Shelley, Eastbourne (GB); Peter George Stammers, Eastbourne (GB); Brian Stuart Blakeley Roberts, Eastbourne (GB)

(73) Assignee: Edwards Limited, West (GB)

( * ) Notice: Subject to any disclaimer, the term of this patent is extended or adjusted under 35 U.S.C. 154(b) by 437 days.

(21) Appl. No.: 17/428,918

(22) PCT Filed: Feb. 20, 2020

(86) PCT No.: PCT/GB2020/050403
§ 371 (c)(1),
(2) Date: Aug. 5, 2021

(87) PCT Pub. No.: WO2020/169976
PCT Pub. Date: Aug. 27, 2020

(65) Prior Publication Data
US 2022/0090592 A1    Mar. 24, 2022

(30) Foreign Application Priority Data
Feb. 20, 2019  (GB) ..................................... 1902303

(51) Int. Cl.
*F04B 37/14*  (2006.01)
*F04B 41/06*  (2006.01)
(Continued)

(52) U.S. Cl.
CPC .............. *F04B 37/14* (2013.01); *F04B 41/06* (2013.01); *F04B 49/007* (2013.01); *F04B 49/02* (2013.01);
(Continued)

(58) Field of Classification Search
None
See application file for complete search history.

(56) References Cited

U.S. PATENT DOCUMENTS 10,092,862 B2    10/2018  Vines et al.
2007/0048145 A1*  3/2007  Ishii .................... F04D 27/0261
                                                             417/44.2
(Continued)

FOREIGN PATENT DOCUMENTS

CN    105668008 A    6/2016
CN    107110161 A    8/2017
(Continued)

OTHER PUBLICATIONS

Combined Search and Examination Report under Sections 17 and 18(3) dated Aug. 20, 2019 from counterpart GB Application No. 1902303.5, 8 pp.
(Continued)

*Primary Examiner* — Charles G Freay
*Assistant Examiner* — Lilya Pekarskaya
(74) *Attorney, Agent, or Firm* — Shumaker & Sieffert, P.A.

(57) ABSTRACT

A vacuum pumping apparatus may include: a common pumping line having a plurality of pumping line inlets and a pumping line outlet, each pumping line inlet being configured to couple with an outlet of an associated plurality of vacuum processing chambers; at least one primary vacuum pump in fluid communication with the pumping line outlet to pump gas from each vacuum processing chamber; and control logic operable to control operation of the primary vacuum pump in response to an indication of an operating state of the plurality of vacuum processing chambers. In this way, the performance of the primary vacuum pump can be adjusted to match the load provided by the processing chambers and when there is an excess capacity, the perfor-
(Continued)

mance of the primary vacuum pumps can be reduced, which can lead to significant energy savings and reduce wear on the pump.

10 Claims, 1 Drawing Sheet

(51) Int. Cl.

| | | |
|---|---|---|
| *F04B 49/00* | (2006.01) | |
| *F04B 49/02* | (2006.01) | |
| *F04B 49/06* | (2006.01) | |
| *F04B 49/20* | (2006.01) | |
| *F04B 49/22* | (2006.01) | |
| *F04C 25/02* | (2006.01) | |
| *F04C 28/02* | (2006.01) | |
| *F04C 28/08* | (2006.01) | |
| *F04C 28/28* | (2006.01) | |
| *F04D 15/00* | (2006.01) | |
| *F04D 17/16* | (2006.01) | |
| *F04D 19/04* | (2006.01) | |
| *F04D 27/00* | (2006.01) | |
| *F04D 27/02* | (2006.01) | |

(52) U.S. Cl.
CPC .............. *F04B 49/06* (2013.01); *F04B 49/20* (2013.01); *F04B 49/22* (2013.01); *F04C 25/02* (2013.01); *F04C 28/02* (2013.01); *F04C 28/08* (2013.01); *F04C 28/28* (2013.01); *F04D 15/0027* (2013.01); *F04D 17/168* (2013.01); *F04D 19/04* (2013.01); *F04D 27/004* (2013.01); *F04D 27/0261* (2013.01); *F04B 2205/09* (2013.01); *F04C 2220/30* (2013.01)

(56) References Cited

U.S. PATENT DOCUMENTS

| | | | | |
|---|---|---|---|---|
| 2014/0134004 A1* | 5/2014 | Bruex | ...................... | B60T 13/46 417/212 |
| 2014/0277672 A1* | 9/2014 | Manzarek | ............... | F04B 13/00 700/108 |
| 2015/0260174 A1* | 9/2015 | Furuta | ................... | F04D 17/168 417/205 |
| 2015/0260192 A1* | 9/2015 | Iwasaki | ................ | B01D 53/323 415/183 |
| 2016/0245588 A1 | 8/2016 | Baugh et al. | | |
| 2017/0200622 A1* | 7/2017 | Shiokawa | ............... | C23C 16/52 |
| 2017/0204860 A1* | 7/2017 | Nishimura | ............ | F28D 7/0008 |
| 2017/0350395 A1* | 12/2017 | Schofield | ............ | C23C 16/4412 |
| 2018/0274615 A1* | 9/2018 | Fiala | ....................... | F04B 41/06 |
| 2020/0080549 A1* | 3/2020 | Galtry | ................. | F04D 27/0269 |
| 2021/0108632 A1* | 4/2021 | Liu | .......................... | F04B 49/06 |

FOREIGN PATENT DOCUMENTS

| | | |
|---|---|---|
| DE | 202004015599 U1 | 2/2005 |
| GB | 2407132 A | 4/2005 |
| GB | 2533933 A | 7/2016 |
| TW | 201839265 A | 11/2018 |
| WO | 2009077777 A1 | 6/2009 |
| WO | 2018100342 A1 | 6/2018 |
| WO | 2019038327 A1 | 2/2019 |
| WO | 2019103825 A2 | 5/2019 |

OTHER PUBLICATIONS

International Search Report and Written Opinion dated Apr. 17, 2020 from counterpart International Application No. PCT/GB2020/050403, 14 pp.

Examination Report under Section 18(3) dated May 28, 2021 from counterpart GB Application No. 1902303.5, 4 pp.

Office Action and Search Report, and translation thereof, from counterpart Taiwan Application No. 109105473 dated Jun. 5, 2023, 13 pp.

Translation of First Office Action and Search Report from counterpart Chinese Application No. 202080015787.2 dated Jul. 26, 2022, 6 pp.

* cited by examiner

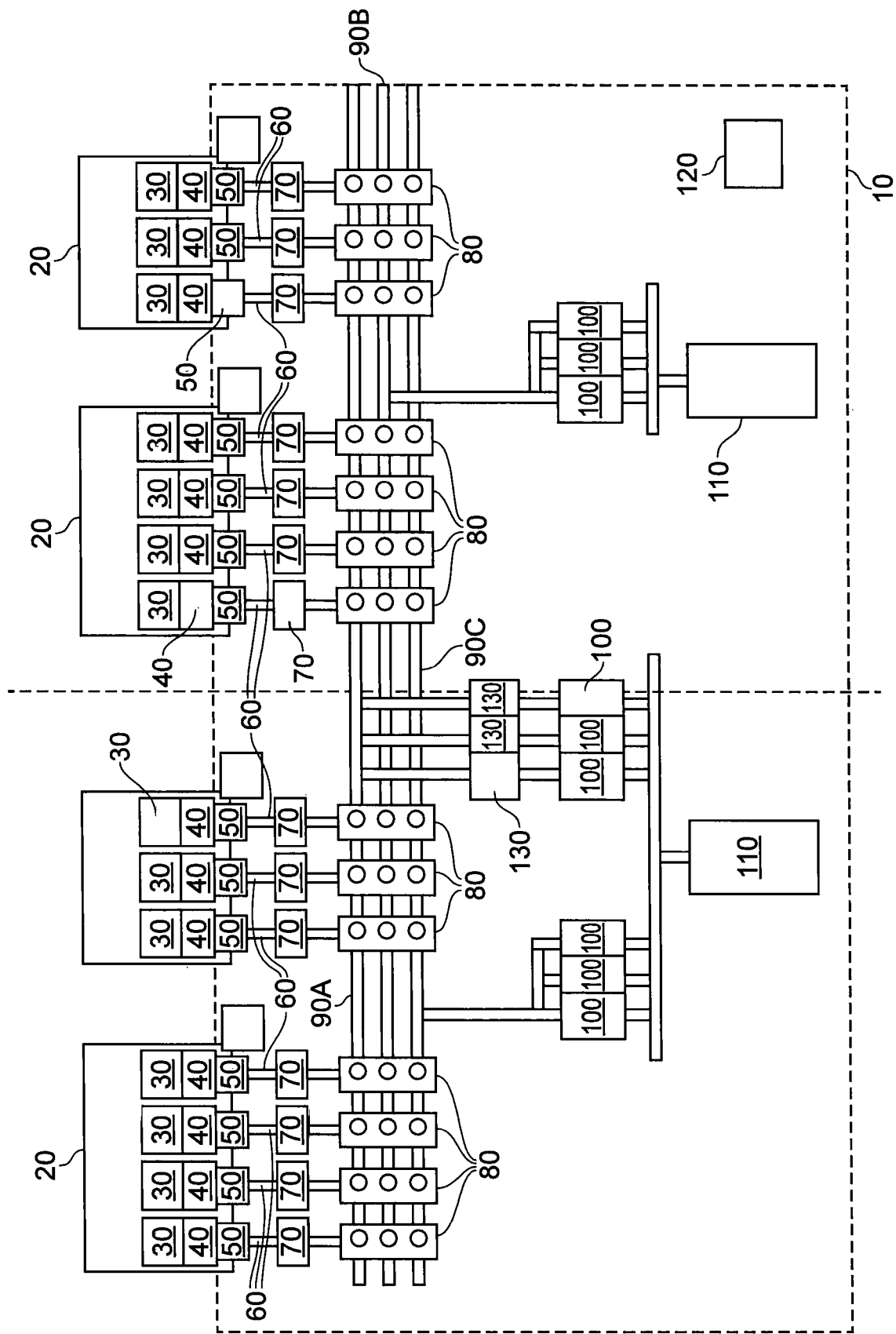

VACUUM PUMPING

This application is a national stage entry under 35 U.S.C. § 371 of International Application No. PCT/GB2020/050403, filed Feb. 20, 2020, which claims the benefit of GB Application No. 1902303.5, filed Feb. 20, 2019, the entire contents of each of which are incorporated herein by reference.

TECHNICAL FIELD

The field of the disclosure relates to a vacuum pumping apparatus and method.

BACKGROUND

Vacuum pumping apparatus are used extensively in vacuum processing, particularly in semiconductor fabrication facilities. The processing tools of the fabrication facility require vacuum pressures in the presence of selected gases, and vacuum pumping systems provide evacuation of these gases at the vacuum pressures that are required.

Although vacuum pumping apparatus exist, they each have their own shortcomings. Accordingly, it is desired to provide an improved vacuum pumping apparatus.

SUMMARY

According to a first aspect, there is provided a vacuum pumping apparatus comprising: a common pumping line having a plurality of pumping line inlets and a pumping line outlet, each pumping line inlet being configured to couple with an outlet of an associated plurality of vacuum processing chambers; at least one primary vacuum pump in fluid communication with the pumping line outlet to pump gas from each vacuum processing chamber; and control logic operable to control operation of the primary vacuum pump in response to an indication of an operating state of the plurality of vacuum processing chambers.

The first aspect recognises that a vacuum pumping apparatus may serve multiple processing chambers connected via a common pumping line. In order to meet the maximum process needs of the processing chambers, the apparatus will typically be oversized compared with average processing needs. Accordingly, a vacuum pumping apparatus or system is provided. The apparatus may comprise a pumping line which has more than one inlet and at least one outlet. Each pumping line inlet may be coupled with an outlet of an associated one of a plurality of vacuum processing chambers. That is to say, the plurality of vacuum processing chambers may couple with that common or single pumping line. The apparatus may comprise one or more vacuum pumps which may connect with a pumping line outlet of the common pumping line in order to pump gas from the vacuum processing chambers. The apparatus may comprise control logic which may control the operation of the primary vacuum pump, depending on the operating state of the processing chambers. In this way, the performance of the primary vacuum pump can be adjusted to match the load provided by the processing chambers and when there is an excess capacity (meaning that the primary vacuum pumps are being under-utilised) then the performance of the primary vacuum pumps can be reduced which can lead to significant energy savings and reduce wear on the pump.

In some examples, the control logic is operable to vary an operating speed of the primary vacuum pump in response to the indication. Accordingly, the speed of the vacuum pump may be reduced or increased based on the load generated by the processing tools.

In some examples, the control logic is operable to vary the operating speed to match a gas pumping rate of the vacuum pump to an indicated gas flow rate from the plurality of vacuum processing chambers. Accordingly, the speed of the vacuum pump may be changed or adjusted to match the load generated by the processing tools.

In some examples, the apparatus comprises a plurality of primary vacuum pumps.

In some examples, the control logic is operable to deactivate at least one of the primary vacuum pumps in response to the indication. Accordingly, one or more of the primary vacuum pumps may be shut down or rendered inactive when not required.

In some examples, the operable control logic is operable to control operation of downstream apparatus in response to the indication. Accordingly, the performance of other apparatus downstream from the common pumping line may be adjusted to match the expected load, thereby providing further efficiency savings.

In some examples, the downstream apparatus comprises an abatement apparatus.

In some examples, the operable control logic is operable to vary an amount of energy supplied to the abatement apparatus in response to the indication. Accordingly, the energy supplied to the abatement apparatus and with it it's operating temperature may be adjusted, depending on the output of the processing chambers.

In some examples, the apparatus comprises a plurality of abatement apparatus and wherein the operable control logic is operable to deactivate at least one of the plurality of abatement apparatus.

In some examples, the operable control logic is operable to vary an amount of diluent gas supplied to at least one of the primary vacuum pumps, the secondary vacuum pump and the abatement apparatus in response to the indication.

In some examples, the indication is provided by the plurality of vacuum processing chambers. Accordingly, the flow rate being emitted by the processing chambers may be provided from the processing chambers themselves.

In some examples, the indication is provided by apparatus supplying the plurality of vacuum processing chambers. Accordingly, an indication of the flow rates of the gases being supplied to the processing chambers may be provided to the control logic.

In some examples, the indication indicates a gas flow rate through the plurality of vacuum processing chambers.

In some examples, the indication is provided by at least one of a pressure sensor and a flow sensor coupled with a respective pumping line inlet.

In some examples, the indication is provided by a flow control valve coupled with a respective pumping line inlet.

In some examples, the apparatus comprises secondary vacuum pumps coupled between the inlets and the chamber and the indication is provided by one of a power consumption and speed of the secondary vacuum pumps.

In some examples, the apparatus comprises at least one further common pumping line, each having a plurality of pumping line inlets and a pumping line outlet, each pumping line inlet being configured to couple with an outlet of an associated plurality of vacuum processing chamber; and at least one further primary vacuum pump in fluid communication with the pumping line outlet to pump gas from each vacuum processing chamber.

In some examples, the apparatus comprises a manifold operable to selectively couple each vacuum processing chamber with the common pumping lines and wherein the indication provides an indication of a configuration the manifold.

According to a second aspect, there is provided a method, comprising: coupling a plurality of pumping line inlets of a common pumping line with an outlet of an associated plurality of vacuum processing chambers; coupling a pumping line outlet of the common pumping line with at least one primary vacuum pump to pump gas from each vacuum processing chamber; and controlling operation of the primary vacuum pump in response to an indication of an operating state of the plurality of vacuum processing chambers.

In some examples, the controlling comprises varying an operating speed of the primary vacuum pump in response to the indication.

In some examples, the controlling comprises varying the operating speed to match a gas pumping rate of the vacuum pump to an indicated gas flow rate from the plurality of vacuum processing chambers.

In some examples, the coupling comprises coupling with a plurality of primary vacuum pumps.

In some examples, the controlling comprises deactivating at least one of the primary vacuum pumps in response to the indication.

In some examples, the controlling comprises controlling operation of downstream apparatus in response to the indication.

In some examples, the downstream apparatus comprises an abatement apparatus.

In some examples, the controlling comprises varying an amount of energy supplied to the abatement apparatus in response to the indication.

In some examples, the downstream apparatus comprises a plurality of abatement apparatus and wherein the controlling comprises deactivating at least one of the plurality of abatement apparatus.

In some examples, the controlling comprises varying an amount of diluent gas supplied to at least one of the primary vacuum pumps, the secondary vacuum pump and the abatement apparatus in response to the indication.

In some examples, the indication is provided by the plurality of vacuum processing chambers.

In some examples, the indication is provided by apparatus supplying the plurality of vacuum processing chambers.

In some examples, the indication indicates a gas flow rate through the plurality of vacuum processing chambers.

In some examples, the indication is provided by at least one of a pressure sensor and a flow sensor coupled with a respective pumping line inlet.

In some examples, the indication is provided by a flow control valve coupled with a respective pumping line inlet.

In some examples, the method comprises providing secondary vacuum pumps coupled between the inlets and the chamber and the indication is provided by one of a power consumption and speed of the secondary vacuum pumps.

In some examples, the method comprises providing at least one further common pumping line, each having a plurality of pumping line inlets and a pumping line outlet, each pumping line inlet being configured to couple with an outlet of an associated plurality of vacuum processing chamber and at least one further primary vacuum pump in fluid communication with the pumping line outlet to pump gas from each vacuum processing chamber.

In some examples, the method comprises providing a manifold operable to selectively couple each vacuum processing chamber with the common pumping lines and wherein the indication provides an indication of a configuration the manifold.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF DRAWINGS

Examples of the present disclosure will now be described further, with reference to the accompanying drawing.

FIG. 1 illustrates a vacuum pumping apparatus, according to one example.

DETAILED DESCRIPTION

Before discussing the examples in any more detail, first an overview will be provided. Examples provide an arrangement where one or more primary vacuum pumps and/or other downstream processing equipment which couple with vacuum processing chambers can have their operation optimized to match their performance against the load or output coming from those vacuum processing chambers. In particular, the vacuum pumps will typically be sized to be able to cope with the maximum load provided when the processing chambers are all operating at their peak and generating a maximum output load, such as during chamber roughing or pump down. However, it will often be the case that the actual load being generated will be lower, since some processing chambers may be not in use or may have a lower than expected output. This means that the vacuum pumps and/or other downstream equipment may be over-provisioned, providing more capacity than is required. Hence, the operation of those devices is controlled to match the operating state of the processing chambers, thereby reducing energy consumption and prolonging life.

FIG. 1 illustrates a vacuum pumping apparatus 10, according to one example. In this example, the vacuum processing apparatus 10 couples with four processing tools 20A. Each processing tool 20 has a number of processing chambers; for example, one processing tool 20 has four processing chambers 30. It will be appreciated that the number of processing tools and processing chambers may vary, depending on requirements and that a single arrangement is also envisaged.

Each processing chamber is coupled with a pump such as a turbo pump 40. Although in this example turbo pumps 40 are provided, it will be appreciated that other forms of secondary pump are possible, as well as an arrangement which has no secondary pump. Also, although the turbo pumps 40 in this example form part of the vacuum pumping apparatus 10, it will be appreciated that they may instead be provided by the provider of the processing tools 30. Each turbo pump 40 couples via a gate valve 50 and a fore-line 60 to a booster pump 70.

Each booster pump 70 connects with a multiway valve 80. In this example, each multiway valve is a four-port multiway valve, meaning that its inlet which couples with the booster pump 70 can be coupled with any of three outputs. Each output of the valves 80 couples with a corresponding common pumping line 90A-90C.

Hence, it can be seen that each common pumping line 90A-90C has a plurality of pumping line inlets which couple with a corresponding outlet of the valves 80. In the example shown in FIG. 1, each common pumping line 90A-90C has 14 pumping line inlets, each of which couples via the booster pump 70, fore-line 60, gate valve 50 and turbo pump 40 with an associated processing chamber 30. Each common pumping line 90A-90C has at least one pumping line outlet which couples with one or more primary vacuum pumps 100, such as a roots-type mechanical pump.

In the example shown in FIG. 1, each common pumping line is coupled with three primary vacuum pumps 100, but greater or fewer than this may be provided. The primary vacuum pumps 100 are, in turn, coupled with a downstream abatement device 110.

The presence of multiple common pumping lines 90A-90C helps to ensure that incompatible chemicals being provided from different processing chambers 30 do not interact and result in an adverse reaction. In other arrangements, only a single common pumping line may be utilised.

Control logic 120 is provided which receives signals which provide an indication of the operating conditions and effluent streams being generated by each of the processing chambers 30, together with the configurations of each of the valves 80, in order to assess an expected effluent stream flow through each of the common pumping lines 90A-90C. Typically, this indication is provided from one or more pressure sensors on the valves 80 (manifolds). With this information, an assessment can be made of how much pumping capacity or abatement capacity is required from the primary pumps 100 and/or the abatement devices 110 and/or the plasma devices 130 or other fore-line abatement devices.

For example, if it is determined that there is currently no effluent stream flowing through a common pumping line then the downstream equipment can be placed in an idle mode or even switched off. Similarly, if the effluent stream flow through a common pumping line is reduced, then the downstream equipment can have its performance reduced to match. For example, each of the secondary pumps 100 can have their speed reduced to match the expected load, or some of the pumps can be switched off altogether and others left running at a higher speed. Likewise, the operating performance of the abatement devices 110 or the plasma devices 130 can be changed to match the expected load by varying the energy supplied to those. Similarly, the amount of diluent gas supplied to the abatement devices 110 can also be changed. Also, the amount of other utilities such as cooling water, oxidant or other gases, make up water can also be changed to match the expected load or operating conditions.

It will be appreciated that the flow rate of the effluent stream provided by each of the processing chambers 30 can be determined in a variety of different ways. The flow rate may be provided by control valves (not shown) supplying the chambers since these valves typically control flow to maintain a pressure and the flow is derived from the control valve position. Alternatively, or additionally, the flow rates may be determined by measuring the power consumption and/or speed of the turbo pumps 40 and/or the booster pumps 70. Alternatively, or additionally, the flow rates may be determined from the pressure sensors on the valves 80.

Some examples provides an area vacuum and abatement system which serves multiple processing modules with common, manifold connected pumping and abatement systems. In order to meet the maximum process needs such systems must be oversize compared with average system needs. There is therefore an excess of capacity which represents a utility saving opportunity. Some examples permits dynamic utility saving with or without signals from each tool.

During processing, tools are designed to expect full vacuum performance at any one time. To support the potential for all processing modules to be on any single leg of the manifold there must be an over provision of vacuum and abatement on all legs of the system. As an individual processing module will only connect to one leg at a time across the whole system this over provision will potentially consume excessive utilities including power, cooling water and nitrogen.

In some examples, the monitoring system maintains a dynamic picture of the gas load on each leg of the manifold based on a total of the gas flows exiting from all the connected process modules (chambers). The totalised flows are used to determine the demand on the area pumping and abatement system. The demand value is used to optimise how many pump cartridges are running and at what speed as well as optimising fuel and gas mixtures within the abatement system. The gas flows from each tool could be derived by combining data from a number of sources: Tool signal directly or indirectly to the system tool interface; Position information of pressure control devices such as tool butterfly valves; The electrical load at on tool pumps such as Turbos and Booster Pumps.

Some examples performs management of the vacuum/abatement provision of an area vacuum/abatement system by combining chamber demand with the routing through a manifold system to minimise utility consumption.

Although illustrative examples of the disclosure have been disclosed in detail herein, with reference to the accompanying drawings, it is understood that the disclosure is not limited to the precise example and that various changes and modifications can be effected therein by one skilled in the art without departing from the scope of the disclosure as defined by the appended claims and their equivalents.

The invention claimed is:

1. A vacuum pumping apparatus comprising:
   a common pumping line having a plurality of pumping line inlets and a pumping line outlet, each pumping line inlet being configured to be coupled with an outlet of an associated vacuum processing chamber of a plurality of vacuum processing chambers;
   at least one primary vacuum pump in a fluid communication with the pumping line outlet to pump a process gas from each vacuum processing chamber; and
   a control logic operable to control an operation of the at least one primary vacuum pump and a downstream abatement apparatus in response to an indication of an operating state of the plurality of vacuum processing chambers, wherein the control logic is operable to vary an amount of diluent gas supplied to the at least one primary vacuum pump based on the indication of the operating state of the plurality of vacuum processing chambers.

2. The vacuum pumping apparatus of claim 1, wherein the control logic is operable to vary an operating speed of the at least one primary vacuum pump in response to the indication of the operating state of the plurality of vacuum processing chambers.

3. The vacuum pumping apparatus of claim 1, wherein the control logic is operable to vary an operating speed to match a gas pumping rate of the at least one primary vacuum pump to an indicated gas flow rate from the plurality of vacuum processing chambers.

4. The vacuum pumping apparatus of claim 1, wherein the at least one primary vacuum pump comprises a plurality of primary vacuum pumps, and wherein the control logic is operable to deactivate the at least one of the plurality of primary vacuum pumps in response to the indication of the operating state of the plurality of vacuum processing chambers.

5. The-vacuum pumping apparatus of claim 1, wherein the-control logic is operable to vary an amount of energy supplied to the downstream abatement apparatus in response to the indication of the operating state of the plurality of vacuum processing chambers.

6. The vacuum pumping apparatus of claim 1, wherein the indication of the operating state indicates a process gas flow rate through the plurality of vacuum processing chambers.

7. The vacuum pumping apparatus of claim 1, wherein the indication of the operating state is provided by at least one of a pressure sensor or a flow control valve coupled with a respective pumping line inlet of the plurality of pumping line inlets.

8. The vacuum pumping apparatus of claim 1, further comprising secondary vacuum pumps coupled between the plurality of pumping line inlets and the plurality of vacuum pumping chambers and the indication of the operating state is provided by one of a power consumption and speed of the secondary vacuum pumps.

9. A vacuum pumping apparatus comprising:
a common pumping line having a plurality of pumping line inlets and a pumping line outlet, each pumping line inlet being configured to be coupled with an outlet of an associated vacuum processing chamber of a plurality of vacuum processing chambers;
at least one primary vacuum pump in a fluid communication with the pumping line outlet to pump a gas from each vacuum processing chamber; and
a control logic operable to control an operation of the at least one primary vacuum pump in response to an indication of an operating state of the plurality of vacuum processing chambers, a manifold operable to selectively couple each vacuum processing chamber with the common pumping line and the at least one further common pumping line, and
wherein the indication of the operating state of the plurality of vacuum processing chambers provides an indication of a configuration of the manifold.

10. A method comprising:
coupling a plurality of pumping line inlets of a common pumping line with an associated outlet of a vacuum processing chamber of a plurality of vacuum processing chambers;
coupling a pumping line outlet of the common pumping line with at least one primary vacuum pump to pump a process gas from each vacuum processing chamber;
and controlling an operation of the at least one primary vacuum pump and a downstream abatement apparatus in response to an indication of an operating state of the plurality of vacuum processing chambers, wherein controlling the operation of the at least one primary vacuum pump comprises varying an amount of diluent gas supplied to the at least one primary vacuum pump based on the indication of the operating state of the plurality of vacuum processing chambers.

* * * * *